United States Patent [19]
Kim

[11] Patent Number: 6,081,365
[45] Date of Patent: Jun. 27, 2000

[54] ACOUSTO-OPTIC MODULATOR AND MANUFACTURING METHOD THEREOF

[75] Inventor: Yong-hoon Kim, Sungnam, Rep. of Korea

[73] Assignee: Samsung Electronics, Co., Ltd., Suwon, Rep. of Korea

[21] Appl. No.: 09/287,634

[22] Filed: Apr. 7, 1999

[51] Int. Cl.[7] ...................................................... G02F 1/33
[52] U.S. Cl. ...................... 359/312; 359/305; 359/308; 359/311; 359/285
[58] Field of Search ................................. 359/305, 308, 359/309, 311, 312, 322, 323, 285, 585, 885, 890

[56] References Cited

U.S. PATENT DOCUMENTS 5,102,213  4/1992  Lee et al. ................................. 359/890
5,521,759  5/1996  Dobrowolski et al. ................... 359/585
5,900,966  5/1999  Kim et al. ................................. 359/311

*Primary Examiner*—Loha Ben
*Attorney, Agent, or Firm*—Burns, Doane, Swecker & Mathis, LLP

[57] ABSTRACT

An acousto-optic modulator comprised of an acousto-optic element coated with an anti-reflection layer, and a method of manufacturing the same, are provided. The acousto-optic modulator includes an anti-reflection layer, comprised of at least two coating layers having different refractive indices, formed on the light incident/emitting surface of an ultrasonic medium for modulating a light beam incident from an optical source.

14 Claims, 4 Drawing Sheets

ACOUSTO-OPTIC MODULATOR AND MANUFACTURING METHOD THEREOF

This application corresponds to Korean Patent Application No. 96-46313 filed on Oct. 26, 1996; the entire content of which is hereby incorporated by reference.

BACKGROUND OF THE INVENTION

1. Field of the Invention

The present invention relates to an acousto-optic modulator and a manufacturing method thereof, and more particularly, to an acousto-optic modulator comprised of an acousto-optic device coated with an anti-reflection layer and a manufacturing method thereof.

2. Description of the Related Art

The acousto-optic systems currently in use are comprised of an optical source, an acousto-optic modulator (AOM), and an optic system. Here, the optical source generates a second harmonic frequency being a continuous wave in the bluish-green area. The AOM controls the second harmonic frequency by diffraction by applying the acousto-optic effect. The optical system is arranged between the optical source and the AOM and controls laser.

A second harmonic oscillator, which is pumped by a laser diode emitting a bluish-green light, is an optical source which is very useful for high-density photomagnetic recording. A bluish-green continuous wave laser must be modulated in accordance with an input signal to be used in an information recording/reproducing apparatus used in an audio/video system. The AOM is used for such modulation. The AOM is an optical device using the acousto-optic effect, is a high-speed optical switch, and is being widely used as an optical output modulation component.

FIG. 1 is a perspective view of an exemplary AOM structure.

Referring to FIG. 1, in the AOM, a transducer 12 for generating an acoustic elastic wave by electrodes 14A and 14B is installed at one side of an ultrasonic medium 10. Also, an acoustic elastic wave absorbing element (not shown) for preventing the influence of reflection of an ultrasonic wave is provided on the opposite side of the ultrasonic medium 10. The ultrasonic medium 10 is made of a material selected from the group consisting of fused quartz, $PbMoO_4$, $TeO_2$, Te glass, and Schwer-Flint glass ($SF_4$). Among them, $PbMoO_4$ or $TeO_2$ crystal material is used for relatively high frequencies, and glass materials are used mainly for low frequencies since it is cheap but has a large propagation loss at a high frequency. Light Incident/emitting surfaces 10A and 10B through which laser light passes are optically polished. On account of a great refractive index of the ultrasonic medium 10, there is a large reflection loss when laser light enters or is emitted.

For example, when $TeO_2$ single crystal is used as a constituent material of the ultrasonic medium, light absorption into the $TeO_2$ single crystal medium and light reflection on the surface thereof cause a reduction of about 25% or more in transmission of laser light when an anti-reflection layer is not coated on the light incident/emitting surfaces. A high-density optical information processor such as a digital video disk recorder (DVDR) requires use of a high output laser. Therefore, when the $TeO_2$ single crystal is used as a constituent material of the ultrasonic medium, the anti-reflection layer should be coated to increase the efficiency of the output power of a laser light.

In the prior art, an $Al_2O_3$ layer has been used to form the anti-reflection layer to be coated on the light incident/emitting surfaces of the ultrasonic medium composed of $TeO_2$ single crystal. The anti-reflection layer formed using the $Al_2O_3$ layer provides excellent permeability and excellent adhesiveness. However, as aging of anti-reflection layer progresses, the output power of laser light becomes lowered relatively rapidly.

SUMMARY OF THE INVENTION

To solve the above problem, it is an object of the present invention to provide an acousto-optic modulator (AOM) coated with an anti-reflection layer, by which the output power of a laser light is not reduced even when high output laser beams are used for a long period of time.

It is another object of the present invention to provide a method of manufacturing the AOM.

Accordingly, to achieve the first object, there is provided an acousto-optic modulator comprising: an anti-reflection layer, comprised of at least two coating layers having different refractive indices, formed on the light incident/emitting surface of an ultrasonic medium for modulating a light beam incident from an optical source.

The ultrasonic medium is formed of $TeO_2$, and the anti-reflection layer is comprised of a first coating layer of $ZrO_2$ and a second coating layer of $SiO_2$.

Each of the first and second coating layers has an optical thickness of $\lambda/4$ at a wavelength of 550 nm.

To achieve the second object, there is provided a method of manufacturing an acousto-optic modulator. In this method, a first coating layer having a first refractive index is deposited to a predetermined thickness on an anti-reflection area of an ultrasonic medium for controlling light incident from an optical source. A second coating layer, having a second refractive index that is different from the first refractive index, is deposited to a predetermined thickness on the first coating layer.

Preferably, the ultrasonic medium is thermally treated at a predetermined temperature before the first coating layer is deposited. Here, the ultrasonic medium is thermally treated at a temperature of 250 to 350° C. for 20 to 40 minutes.

Also, preferably, the resultant structure having the second coating layer is annealed at a temperature of 250 to 300° C. after the second coating layer is deposited.

The annealing is performed under an oxygen atmosphere.

Deposition of the first and second coating layers is performed by electron beam deposition. Deposition of the first coating layer is performed at a near-vacuum pressure of $8 \times 10^{-6}$ torr, and deposition of the second coating layer is performed at a near-vacuum pressure of $6 \times 10^{-6}$ torr.

Preferably, the first coating layer is made of $ZrO_2$, and the second coating layer is made of $SiO_2$.

Each of the first and second coating layers is formed to an optical thickness of $\lambda/4$ at a wavelength of 550 nm.

When the AOM of the present invention is used, lowering of laser output can be prevented even when a high output laser beam is used for a long time. Thus, when the AOM is used as a high-density optical recorder, stability can be maintained for a long time.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENT

In the present invention, an anti-reflection layer comprised of at least two coating layers having different refractive indices is formed on light incident/emitting surfaces, through which laser light passes, of an ultrasonic medium of an acousto-optic modulator (AOM).

Figures 1, 2:
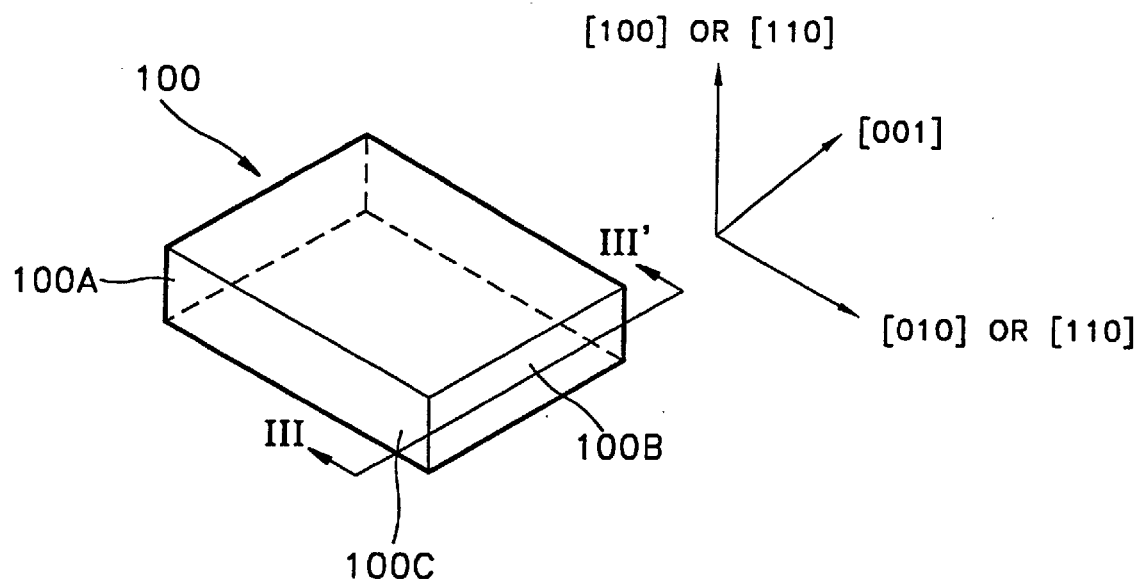
FIG. 1 is a perspective view illustrating an exemplary acousto-optic modulator (AOM) structure.
FIG. 2 is a perspective view illustrating a sample of an ultrasonic medium used to form an anti-reflection layer according to a method of the present invention.

Referring to FIG. 2, $TeO_2$ single crystal is used as an ultrasonic medium 100 used to form an anti-reflection layer in the present invention. The $TeO_2$ single crystal is sliced to have a crystal azimuth shown in FIG. 2. Then, among crystal surfaces of the $TeO_2$ single crystal, light incident/emitting surface 100A or 100B and a surface 100C to which a transducer is provided are accurately processed to have a flatness of about $\lambda/8$ and a flatness of about $\lambda/4$, respectively. In this way, the ultrasonic medium 100 is prepared.

Figure 3:
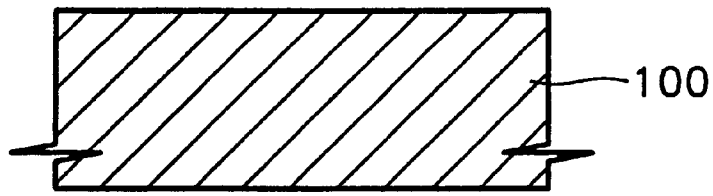
FIGS. 3 through 5 are cross-sectional views illustrating a method of coating an anti-reflection layer on an ultrasonic medium of an AOM, according to a preferred embodiment of the present invention, which correspond to partial cross-sectional views of FIG. 2 taken along line III—III' in the [010] or [110] direction of a crystal surface.
Figure 4:
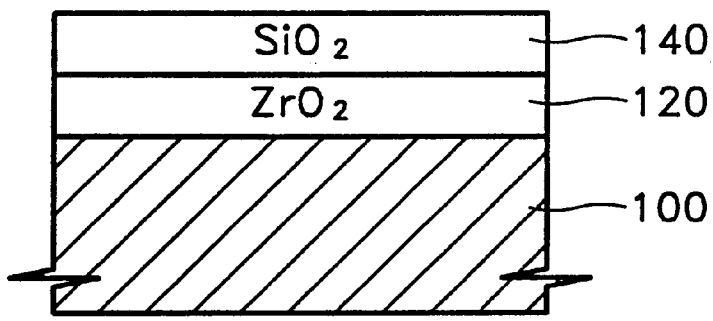
Figure 5:
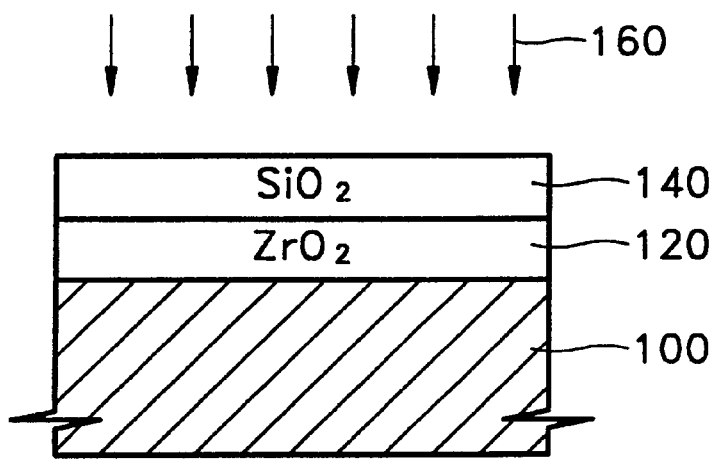

FIGS. 3 through 5 are cross-sectional views illustrating a method of coating an anti-reflection layer on an ultrasonic medium of an AOM, according to a preferred embodiment of the present invention, which correspond to partial cross-sectional views of FIG. 2 taken along line III—III' in the [010] or [110] direction of a crystal surface.

FIG. 3 illustrates the step of thermally treating an ultrasonic medium. To be more specific, in order to form an anti-reflection layer on a desired anti-reflection area, i.e., on the light incident/emitting surface, of the ultrasonic medium, first, an ultrasonic medium 100 made of $TeO_2$ single crystal as described referring to FIG. 2 is thermally treated for about 20 to 40 minutes, preferably, for about 30 minutes. The thermal treatment temperature is about 250 to 350° C. The adhesiveness between the ultrasonic medium 100 and an anti-reflection layer to be coated in a subsequent process can be improved due to the above-described thermal treatment.

FIG. 4 illustrates the step of forming an anti-reflection layer in which two coating layers having different refractive indices are sequentially stacked. A first coating layer 120 having a first refractive index is deposited on the thermally-treated ultrasonic medium 100. Next, a second coating layer 140, having a second refractive index that is different from the first refractive index, is deposited on the first coating layer 120. Preferably, the first and second coating layers 120 and 140 are deposited by electron beam deposition. Here, the first coating layer 120 is a $ZrO_2$ layer having a refractive index of 1.96 formed to have an optical thickness of $\lambda/4$ in a reference wavelength of 550 nm while maintaining a near-vacuum pressure of about $8\times10^{-6}$ torr. Also, the second coating layer 140 is a $SiO_2$ layer having a refractive index of 1.46 formed to have an optical thickness of $\lambda/4$ in a reference wavelength of 550 nm while maintaining a near-vacuum pressure of about $6\times10^{-6}$ torr. In this example, the optical thicknesses of the first and second coating layers 120 and 140 are controlled by being monitored in situ by an optical interference-type film thickness measuring method.

FIG. 5 illustrates the step of annealing the resultant structure. Referring to FIG. 5, the resultant structure is annealed at a temperature of about 250 to 300° C., preferably, about 280° C., under an oxygen (160) atmosphere, in order to improve the adhesive strength of an anti-reflection layer comprised of the first and second coating layers 120 and 140.

Figure 6:
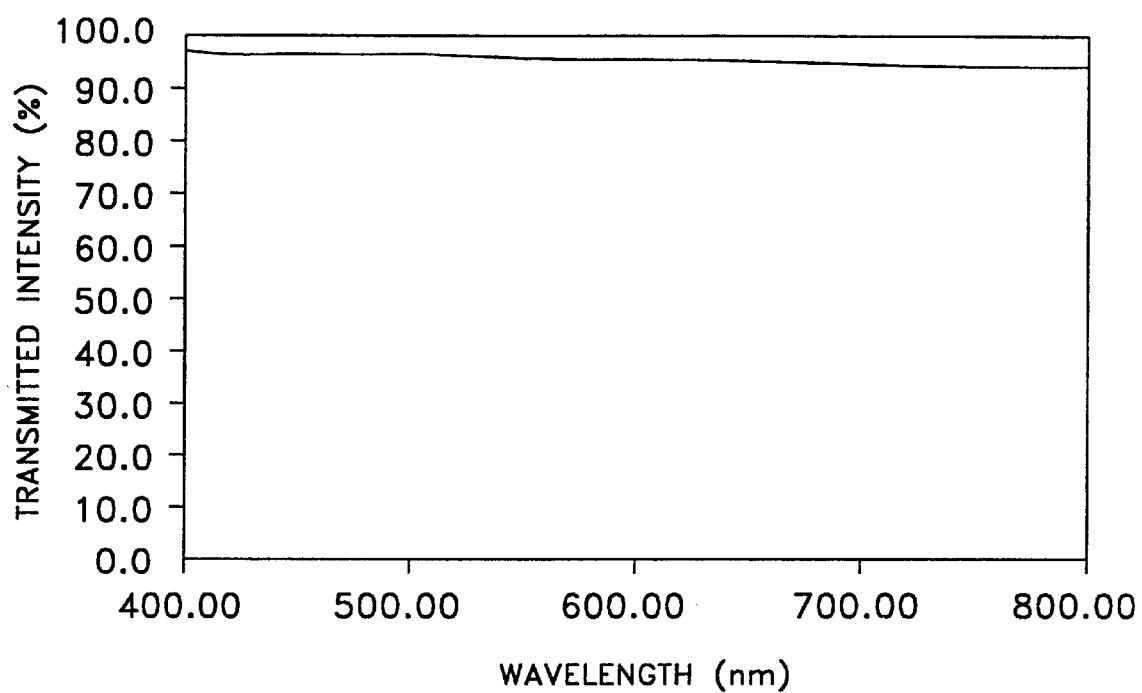
FIG. 6 is a graph illustrating the results of transmitted intensities measured according to wavelength using a spectrophotometer with respect to an anti-reflection layer formed by a method of the present invention.

FIG. 6 is a graph illustrating the results of transmitted intensities measured according to wavelength using a spectrophotometer with respect to an anti-reflection layer formed by a method of the present invention.

As can be seen from FIG. 6, an anti-reflection layer formed by a method of the present invention provides an excellent transmitted intensity of 95% or more in a wavelength between 400 nm and 800 nm.

Figure 7:
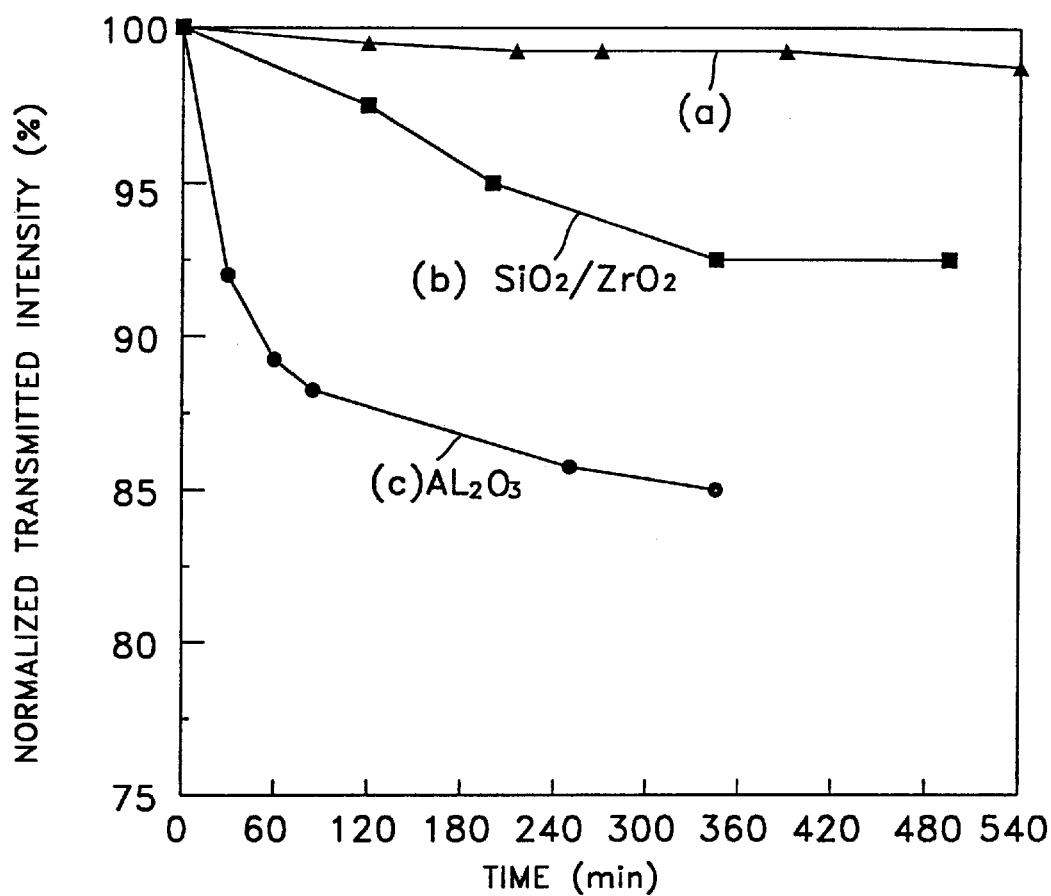
FIG. 7 is a graph illustrating variations in the normalized transmitted intensity according to time with respect to the conditions for forming each anti-reflection layer.

FIG. 7 is a graph illustrating variations in the normalized transmitted intensity according to time with respect to the conditions for forming each anti-reflection layer.

In FIG. 7, (a) denotes the variation in transmitted intensity according to time when a laser beam is irradiated to an ultrasonic medium having no anti-reflection layer, (b) denotes the variation in transmitted intensity according to time when a laser beam is irradiated to an ultrasonic medium having an anti-reflection layer according to the present invention formed on its light incident/emitting surface, and (c) denotes the variation in transmitted intensity according to time when a laser beam is irradiated to an ultrasonic medium having a conventional anti-reflection layer formed on its light incident/emitting surface. The laser used in the above measurement is a 0.55 W argon (Ar) laser, and the beam is irradiated using a focusing lens having a focal length of 300 am.

As can be seen from FIG. 7, reduction in transmitted intensity according to aging of the anti-reflection layer is suppressed in the case of the anti-reflection layer according to the present invention comprised of a $ZrO_2$ layer and an $SiO_2$ layer, compared to the case of the conventional anti-reflection layer comprised of a single $Al_2O_3$ layer. Therefore, it can be recognized that the anti-reflection layer according to the present invention can be prevented from being damaged by laser irradiation.

When the AOM according to the present invention is used, the output of the laser can be prevented from being lowered even when a high-output laser beam is used for a long time. Thus, when the AOM is used as a high-density optical recorder, stability can be maintained for a long time.

The present invention is described in detail referring to a preferred embodiment, but it is not limited to this embodiment. Various modifications may be effected within the technical spirit of the present invention by those skilled in the art.

What is claimed is:

1. An acousto-optic modulator comprising:
    an anti-reflection layer, comprised of at least two coating layers having different refractive indices, formed on the light incident/emitting surface of an ultrasonic medium for modulating a light beam incident from an optical source.

2. The acousto-optic modulator as claimed in claim 1, wherein the ultrasonic medium is formed of $TeO_2$.

3. The acousto-optic modulator as claimed in claim 1, wherein the anti-reflection layer is comprised of a first coating layer of $ZrO_2$ and a second coating layer of $SiO_2$.

4. The acousto-optic modulator as claimed in claim 3, wherein each of the first and second coating layers has an optical thickness of λ/4 at a wavelength of 550 nm.

5. A method of manufacturing an acousto-optic modulator, comprising the steps of:

depositing a first coating layer having a first refractive index to a predetermined thickness on an anti-reflection area of an ultrasonic medium for controlling light incident from an optical source; and depositing a second coating layer having a second refractive index that is different from the first refractive index, to a predetermined thickness on the first coating layer.

6. The method of manufacturing an acousto-optic modulator as claimed in claim 5, further comprising the step of thermally treating the ultrasonic medium at a predetermined temperature, before the step of depositing the first coating layer.

7. The method of manufacturing an acousto-optic modulator as claimed in claim 6, wherein the ultrasonic medium is thermally treated at a temperature of 250 to 350° C. for 20 to 40 minutes.

8. The method of manufacturing an acousto-optic modulator as claimed in claim 6, further comprising the step of annealing the resultant structure having the second coating layer at a temperature of 250 to 300° C., after the step of depositing the second coating layer.

9. The method of manufacturing an acousto-optic modulator as claimed in claim 5, further comprising the step of annealing the resultant structure having the second coating layer at a temperature of 250 to 300° C., after the step of depositing the second coating layer.

10. The method of manufacturing an acousto-optic modulator as claimed in claim 9, wherein the annealing is performed under an oxygen atmosphere.

11. The method of manufacturing an acousto-optic modulator as claimed in claim 5, wherein the steps of depositing the first and second coating layers are performed by electron beam deposition.

12. The method of manufacturing an acousto-optic modulator as claimed in claim 5, wherein the step of depositing the first coating layer is performed at a near-vacuum pressure of $8 \times 10^{-6}$ torr and the step of depositing the second coating layer is performed at a near-vacuum pressure of $6 \times 10^{-6}$ torr.

13. The method of manufacturing an acousto-optic modulator as claimed in claim 5, wherein the first coating layer is made of $ZrO_2$, and the second coating layer is made of $SiO_2$.

14. The method of manufacturing an acousto-optic modulator as claimed in claim 5, wherein each of the first and second coating layers is formed to an optical thickness of λ/4 at a wavelength of 550 nm.

* * * * *